United States Patent [19]
Autor et al.

[11] Patent Number: 6,012,114
[45] Date of Patent: Jan. 4, 2000

[54] SYSTEM FOR PREVENTING SOFTWARE OF A COMPUTER SYSTEM FROM INTERACTING WITH A CONNECTOR TO AVOID DATA CORRUPTION DUE TO SURPRISE REMOVAL OF A CIRCUIT CARD

[75] Inventors: Jeffrey S. Autor; Daniel J. Zink, both of Houston, Tex.

[73] Assignee: Compaq Computer Corporation, Houston, Tex.

[21] Appl. No.: 08/885,063

[22] Filed: Jun. 30, 1997

[51] Int. Cl.[7] .................................................. G06F 13/14
[52] U.S. Cl. .......................... 710/103; 235/380; 361/58; 361/684; 361/801; 711/170; 714/3; 714/48
[58] Field of Search ............................ 235/380; 361/58, 361/684, 801; 710/10, 103, 1; 714/3, 48; 711/170

[56] References Cited

U.S. PATENT DOCUMENTS

| | | | |
|---|---|---|---|
| 4,999,805 | 3/1991 | Gulley et al. | 364/900 |
| 5,310,998 | 5/1994 | Okuno | 235/380 |
| 5,473,499 | 12/1995 | Weir | 361/58 |
| 5,474,463 | 12/1995 | Robinson et al. | 361/684 |
| 5,555,510 | 9/1996 | Verseput et al. | 364/514 R |
| 5,568,610 | 10/1996 | Brown | 395/185.01 |
| 5,742,832 | 4/1998 | Buxton et al. | 395/750 |
| 5,781,798 | 7/1998 | Beatty et al. | 395/830 |
| 5,784,576 | 7/1998 | Guthrie et al. | 395/283 |
| 5,787,019 | 7/1998 | Knight et al. | 364/550 |
| 5,815,647 | 9/1998 | Buckland et al. | 395/182.01 |
| 5,822,196 | 10/1998 | Hastings et al. | 361/801 |
| 5,850,632 | 12/1998 | Robertson | 711/170 |

*Primary Examiner*—Thomas C. Lee
*Assistant Examiner*—Abdelmoniem I Elamin
*Attorney, Agent, or Firm*—Sharp, Comfort & Merrett, P.C.

[57] ABSTRACT

A computer system has a connector and a circuit card that is inserted in the connector. A mechanism that is associated with the connector and the card has a state for indicating when the card is secured to the connector. A controller of the computer system is configured to monitor the state and provide an indication when the state changes. A processor of the computer system is configured to determine when software of the computer system is interacting with the connector and based on the determining and the indication, regulating interaction of the computer system with the card.

24 Claims, 5 Drawing Sheets

SYSTEM FOR PREVENTING SOFTWARE OF A COMPUTER SYSTEM FROM INTERACTING WITH A CONNECTOR TO AVOID DATA CORRUPTION DUE TO SURPRISE REMOVAL OF A CIRCUIT CARD

BACKGROUND

The invention relates to the prevention of data corruption.

Computer systems typically have expansion card slots for receiving and electrically coupling interchangeable circuit cards to an expansion bus of the computer system. The expansion bus may be one of several types, such as an Industry Standard Architecture (ISA) bus, an Extended Industry Standard Architecture (EISA) bus or a Peripheral Component Interconnect (PCI) bus.

SUMMARY

In general, in one aspect, the invention features a method for use in a computer system having a connector that is capable of receiving a removable circuit card. A mechanism that is associated with the card and connector has a state that indicates when the card is secured to the connector. The method includes determining when software of the computer system is interacting with the connector, and based on the determining, corrective action is taken to prevent the software from interacting with the connector when the state of the mechanism indicates the card is not secured to the connector.

Implementations of the invention may include one or more of the following. The corrective action taken may include halting the computer system, and the halting may only occur when the software is interacting with the circuit card. The computer system may includes a central processing unit that has an interrupt pin, and the corrective action taken may include providing an interrupt signal (e.g., a nonmaskable interrupt signal) to the pin. A first address range used by the software may be stored in a registry of the computer system, and a second address range that is accessible may be stored via the connector. The determining may include comparing the first and second address ranges. The central processing unit may have a first interrupt pin for receiving a first type of interrupt signal and a second interrupt pin for receiving a second type of interrupt signal. The first type of interrupt signal may always have a higher priority than the second type of interrupt signal. The corrective action taken may include providing the first type of interrupt signal to the first interrupt pin. The interrupt signal of the second type may be sent to the second interrupt pin when the software is not interacting with the connector.

In general, in another aspect, the invention features a method for use in a computer system that has a central processing unit and connectors. The central processing unit has a nonmaskable interrupt pin for receiving a nonmaskable interrupt signal and a maskable interrupt pin for receiving a maskable interrupt signal. Each connector is capable of receiving a removable circuit card and is connected to a clamp for securing the card to the connector when the clamp is engaged. The method includes determining which of the connectors are being used by software of the computer system; monitoring the engagement state of the clamps; providing the maskable interrupt signal to the maskable interrupt pin when the clamp becomes disengaged and the associated connector is not being used by the software of the computer system; and taking corrective action to prevent the software from using the card when the clamp becomes disengaged and the associated connector is being used by software of the computer system. The corrective action taken may include providing the nonmaskable interrupt signal to the nonmaskable interrupt pin and halting the computer system in response to the providing the nonmaskable interrupt signal.

In general, in another aspect, the invention features a method for use in a computer system that has a connector for receiving a circuit card. The computer system has a registry for storing a first address range used by software. The circuit card stores a second address range used by the card. The method includes reading the first address range from the registry; reading the second address range from the circuit card; and comparing the first and second address ranges to determine if the software is interacting with the connector.

In general, in another aspect, the invention features a computer system that has a connector and a circuit card that is inserted in the connector. A mechanism that is associated with the connector and the card has a state for indicating when the card is secured to the connector. A controller of the computer system is configured to monitor the state and provide an indication when the state changes. A processor of the computer system is configured to determine when software of the computer system is interacting with the connector and based on the determining and the indication, regulating interaction of the computer system with the card.

In general, in another aspect, the invention features a computer system that has connectors. Each connector is configured to receive a removable circuit card. The computer system also has clamps, and each clamp is associated with one of the connectors and is configured to secure the card to the associated connector when the clamp is engaged. The computer system has a processor that is configured to determine which connectors are being used by software algorithms of the computer system; provide an indication of the connectors being used; inform one or more of the software algorithms that one of the clamps has become disengaged in response to a maskable interrupt signal; and halt the computer system in response to a nonmaskable interrupt signal. The computer system also has a controller that is configured to monitor the engagement status of the clamps; provide the maskable interrupt signal when one of the clamps becomes disengaged and the associated connector is not being used by any of the software algorithms of the computer system; and provide the nonmaskable interrupt signal when one of the clamps becomes disengaged and the associated connector is being used by one or more software algorithms of the computer system.

In general in another aspect, the invention features a computer system that has a connector and a memory that stores a first address range used by a software algorithm. The computer system also has a removable circuit card that is inserted into the connector. The circuit card stores a second address range that is accessible through the connector. A processor of the computer system is configured to read the first address range from the memory, read the second address range from the circuit card, and compare the first and second address ranges to determine if the software algorithm is interacting with the connector is being used by the software algorithm.

Among the advantages of the invention are one or more of the following. Data corruption due to "surprise removal" of the circuit card is minimized. The system is backwards compatible with software driver routines written for systems incapable of hot-plugging circuit cards. Only circuit cards that are currently being used by software drivers initiate a shut-down of the computer system when removed.

Other advantages and features will become apparent from the following description and from the claims.

DESCRIPTION

Figure 1:
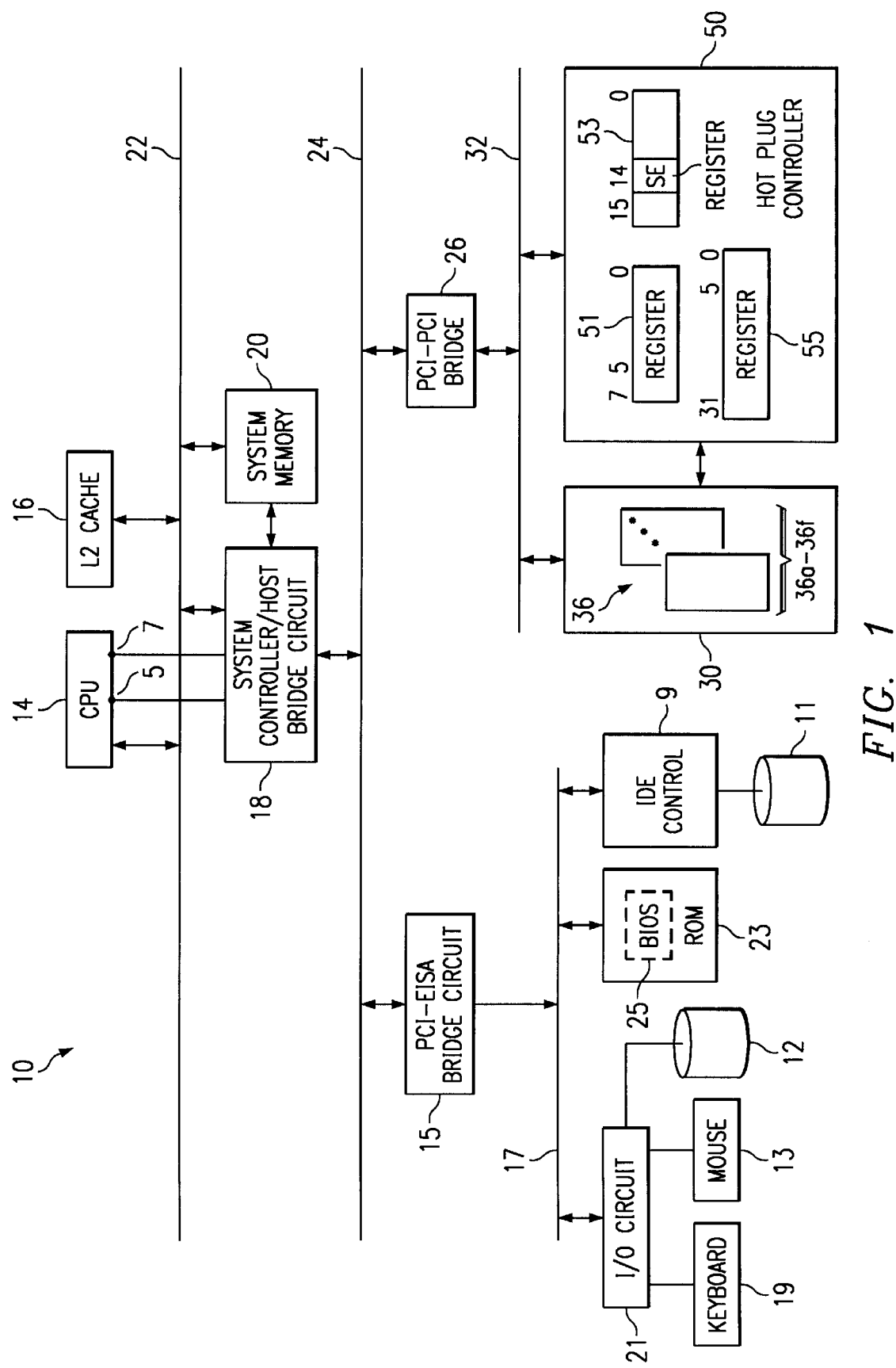
FIG. 1 is a block diagram of a computer system.
Figure 2:
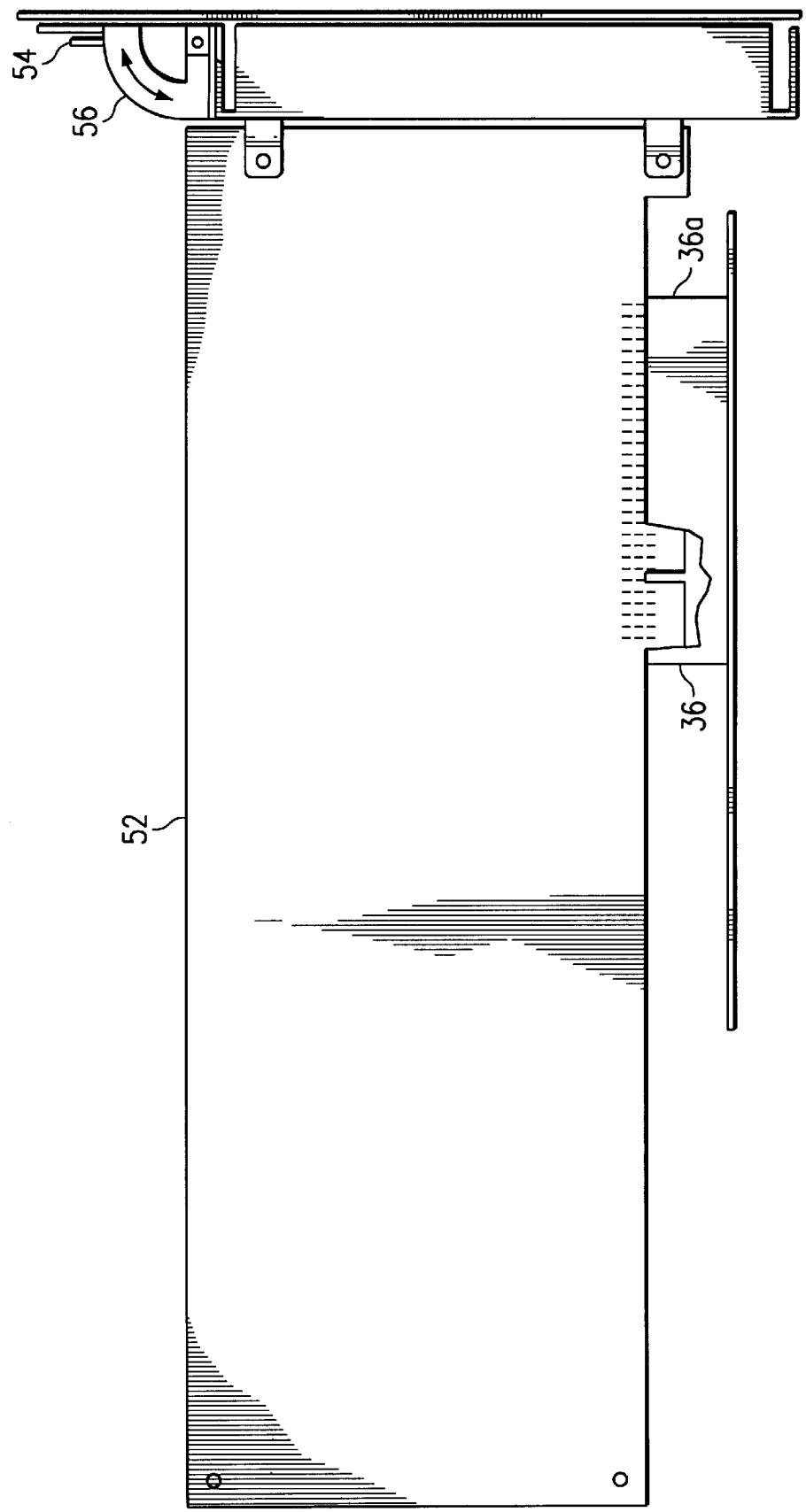
FIG. 2 is a schematic view of a circuit card inserted into a card slot.

Referring to FIGS. 1 and 2, to allow interchangeable circuit cards 52 (FIG. 2) to be inserted and removed while a computer system 10 remains powered up, only connectors, or slots 36a–f, (and not the entire computer system 10) are powered down before either insertion of or removal of the card 52. However, because the computer system 10 remains powered up, data corruption may be introduced into the system 10 due to attempted accesses (i.e., failed accesses) to the cards 52 that are removed. To prevent this from occurring, the computer system 10 is configured to take corrective action (described below) when imminent removal of one of the cards 52 is detected.

The removal of one of the cards 52 from the system 10 effectively occurs not only when the card 52 is physically removed from its slot 36 but also when the slot 36 in which the card 52 resides is powered down. One of the cards 52 is present in, or connected to, the system 10 only when the card 52 is present in the slot 36 and that slot 36 is powered up.

Typically, cards 52 (i.e., devices present on the cards 52) that are present at power up of the computer system 10 are recognized by a one time searching, or "walking," of the system 10 by a central processing unit (CPU) 14. Then, in the normal course of operation, the CPU 14 executes software driver routines (e.g., a Small Computer Systems Interface (SCSI) driver routine) to access (e.g., read from or write to) devices of the circuit cards 52. However, the walking of the computer system 10 only occurs at power up of the system 10, and a user may decide to remove one of the circuit cards 52 without first informing the software driver routine that is using the card 52. As a result, data corruption may occur as the software driver routine assumes valid data is being written to or read from a circuit card 52 that has been removed from the computer system 10.

As an example of the potential for data corruption, one of the circuit cards 52 may be a Small Computer Systems Interface (SCSI) controller (not shown) that retrieves data from a disk drive (not shown). The CPU 14 (through the execution of software) transfers data from the disk drive to a system memory 20 by interacting with a Peripheral Component Interconnect (PCI)-PCI bridge 26 to furnish a read cycle to a bus 32 to which the SCSI controller (i.e., one of the cards 52) is connected. As typical, when the SCSI controller is present in the system 10 (i.e., when the SCSI controller is connected to the bus 32), the read cycle is recognized (due to the presence of an address in the read cycle) by the SCSI controller and claimed. Once claimed, the SCSI controller furnishes the data that is requested to the bus 32, and the data is transferred via the PCI-PCI bridge 26 to the system memory 20.

A different scenario occurs when the CPU 14 attempts to access a non-present SCSI controller (e.g., a SCSI controller that is present on a card 52 that has been removed from the system 10 or is in a slot 36 that has been powered down). When this occurs, the read cycle furnished to the bus 32 is not claimed, and (being unclaimed) is eventually aborted (i.e., a condition often referred to as a master abort) after a predetermined number of bus clock cycles elapse. As a result, although the PCI-PCI bridge 26 knows the read cycle was unclaimed, the bridge 26 may not be configured to alert (e.g., by an interrupt request) the CPU 14 that the read cycle failed. Without this warning, the CPU 14 assumes the read cycle was completed, and to confirm this (incorrect) assumption, the bridge 26 furnishes default data (e.g., "FFFF_FFFFh," wherein the suffix "h" indicates a hexadecimal representation) to the CPU 14. Thus, the CPU 14 assumes (not knowing otherwise) that the default data is valid data furnished in response to the read cycle. In this manner, several read cycles may occur before the CPU 14 realizes that the SCSI controller is missing.

To prevent this scenario, the system 10 has a hot plug controller 50 (coupled to the bus 32) that is configured to, under certain circumstances (described below), furnish a high priority, nonmaskable interrupt (NMI) request (through a system error signal called SERR#) to the CPU 14. In response to the NMI request, the CPU 14 executes an NMI handler 72 (shown in FIG. 3 and described below) that configures the CPU 14 to halt the computer system 10. As a result, the user must reboot the computer system 10 which forces the CPU 14 to "walk" the system 10 for devices that are present. After the reboot, the software does not recognize circuit cards 52 that are not present in the system 10, and data corruption due to removal of the card 52 is prevented.

The removal of some cards 52 does not require halting of the computer system 10. For example, although some cards 52 may be present in the system 10, no software driver routines may currently be using the cards 52, i.e., the associated slots 36 are not "in use." When removal of one of these cards 52 is detected, a slower, less drastic approach is used which allows the computer system 10 to remain functional while still notifying future software drivers that the card 52 has been removed.

For the slots 36 that are not "in use," the hot plug controller 50 furnishes a lower priority, maskable interrupt request (via a PCI bus signal called INTA#) to the CPU 14. Unlike the NMI request, the maskable interrupt request is received by a programmable interrupt controller (not shown) along with other nonmaskable interrupt requests of the computer system 10. The interrupt controller selects one of the received interrupt requests based on a predetermined priority scheme (e.g., a round robin priority scheme) and furnishes the selected interrupt to a maskable interrupt pin of the CPU 14. As a result of the priority scheme, one or more nonmaskable interrupt requests might be received and serviced by the CPU 14 before the CPU 14 services the nonmaskable interrupt request provided by the hot plug controller 50. Thus, the CPU 14 will most likely execute several instructions before servicing this interrupt request. Although this delay would be unacceptable if the slot 36 is being used by software drivers, the delay is acceptable if no software is currently using the slot 36.

Referring to FIG. 2, each slot 36 has an associated clamp, or lever 56, which secures the associated card 52 to the slot 36. The hot plug controller 50 powers up the card 52 when the card 52 is both inserted into the slot 36 and the lever 56 is engaged, or latched. The hot plug controller 50 also powers down the card 52 before the card 52 is removed from the slot 36. To accomplish this, the hot plug controller 50 monitors (via a switch 54) the engagement status of the lever 56 and powers down the slot 36 when the lever 56 becomes disengaged.

When the hot plug controller 50 determines the lever 56 of a slot 36 that is powered up has become disengaged (i.e., when imminent removal of the card 52 is detected), the hot plug controller 50 generates an interrupt request (i.e., a NMI or maskable interrupt request) for the CPU 14. If the associated slot 36 is being used by software, the controller 50 furnishes the NMI request. If the card 52 is not being used by software, the hot-plug controller 50 furnishes the maskable interrupt request.

Referring back to FIG. 1, the hot plug controller 50 has registers that are used to control when the computer system 10 is halted (i.e., to control when an NMI request is generated). These registers include a thirty-two bit status register 55 (having contents represented by INTR_REG [31:0]) and an eight bit interrupt type register 51 (having contents represented by TYPE[7:0]). The six least significant bits (represented by INTR_REG[5:0]) of the status register 55 indicate the engagement status (latched or unlatched) for the levers 56 of slots 36a–f, respectively. When one of the bits INTR_REG[5:0] is equal to logic one, the corresponding lever 56 is latched, and when one of the bits of the register 55 is equal to logic zero, the corresponding lever 56 is unlatched.

When one of the bits INTR_REG[5:0] changes logical levels, an interrupt request is generated by the hot plug controller 50. The type (e.g., NMI or maskable) of the interrupt request is determined by the contents of the interrupt type register 51. The six least significant bits (represented by TYPE[5:0]) of the type register 51 indicate the type of interrupt request to be generated when the engagement status of the levers 56 of the slots 36a–f, respectively, changes. A logic one for one of the bits TYPE[5:0] indicates the corresponding slot 36 is in use, and a logic zero for one of the bits TYPE[5:0] bit indicates the corresponding slot 36 is not in use. As described further below, a hot plug driver 70 (see FIG. 3) keeps track (via a device driver registry 62, described below) of which slots 36 are being used by software and sets the bits of the type register 51 accordingly.

Besides the above-described hot plug system, the computer system 10 also includes a level two (L2) cache 16. The L2 cache 16 and the CPU 14 are both coupled to a local bus 22. A system controller/host bridge circuit 18 interfaces the local bus 22 to a primary Peripheral Component Interconnect (PCI) bus 24 and controls access to the system memory 20 (coupled to the local bus 22). The PCI bridge circuit 26 controls access between the primary PCI bus 24 and the secondary PCI bus 32. A PCI-Extended Industry Standard Architecture (EISA) bridge circuit 15 interfaces the primary PCI bus 24 to an EISA bus 17. An input/output (I/O) circuit 21, a read only memory (ROM) 23 and an Intelligent Device Electronics (IDE) controller 9 are all coupled to the EISA bus 17. The I/O circuit 21 receives input from a keyboard 19 and a mouse 13 and controls operation of a floppy disk drive 12. The IDE controller 9 controls operation of a hard disk drive 11. The circuit 18 routes interrupt requests to the CPU 14. The CPU 14 receives NMI requests at a NMI pin 5 and maskable requests at a maskable interrupt request pin 7.

Figure 3:
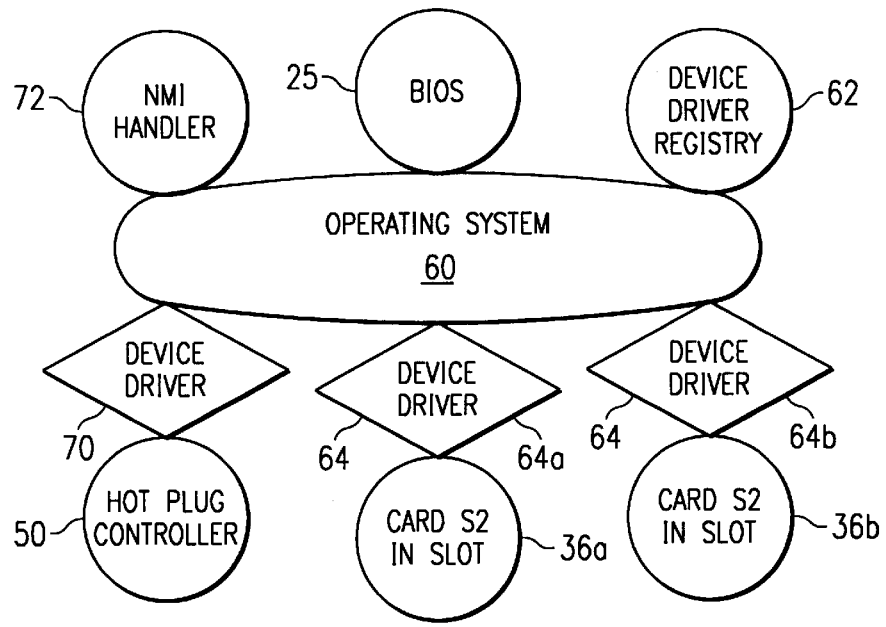
FIG. 3 is a diagram illustrating the architecture of the computer system.

Referring to FIG. 3, algorithms executed by the CPU 14 determine which slots 36 are in use by software drivers, program the hot plug controller 50 with the type (NMI or maskable) of interrupt requests to assert for each slot 36, and service the interrupt requests originating with the hot plug controller 50.

For purposes of controlling devices on the circuit cards 52, the algorithms include device drivers 64 (e.g., a device driver 64a for the card 52 in slot 30a and a device driver 64b for the card 52 in slot 36b) which furnish an interface between an operating system 60 (e.g., Windows NT) and the hardware on the cards 52. To conserve memory space, each driver 64 is typically loaded into the system memory 20 (FIG. 1) from the hard drive 11 only when needed. Besides the device drivers 64 for the cards 52, other device drivers (e.g., the hot plug device driver 70 for the hot plug controller 50) may permanently reside in the system memory 20.

The operating system 60 keeps track of device drivers 64 that are being used via the device driver registry 62 (stored in the system memory 20). The registry 62 contains a complete list of all hardware resources (e.g., interrupts, I/O addresses and memory addresses) that are being used by each software/hardware driver in the system 10. For each device driver 64, the device driver registry 62 contains a memory space range and an I/O space range which represents the memory and I/O space that the device driver 64 is registered to access. When one of the drivers 64 begins using one of the slots 36 or when one of the drivers 64 has finished using a particular slot 36 (i.e., when the "in use" status of one of the slots 36 changes), the CPU 14 is notified which subsequently updates the device driver registry 62, and the hot plug driver 70 updates the type register 51.

For purposes of handling nonmaskable interrupt requests, the operating system 60 temporarily transfers control to a nonmaskable interrupt (NMI) handler 72. To handle other interrupt requests, the operating system 60 temporarily transfers control to interrupt handlers (e.g., routines of the device drivers 64) that are registered to handle the particular interrupt request.

Bus devices (e.g., the bus devices on the cards 52) may share more than one interrupt line (e.g., the INTA# line). As a result, for some interrupt requests, the bus devices must be polled to determine the origin of the interrupt request. To respond to the polling, the bus device that generated the interrupt request sets a bit in its configuration space (e.g., referring to FIG. 1, the hot plug controller 50 sets a bit SE (bit 14) of its status configuration register 53). To perform the polling, the operating system 60 temporarily transfers control to a routine of a Basic Input/Output System (BIOS) 25 which is stored in the ROM 23.

Figure 4:
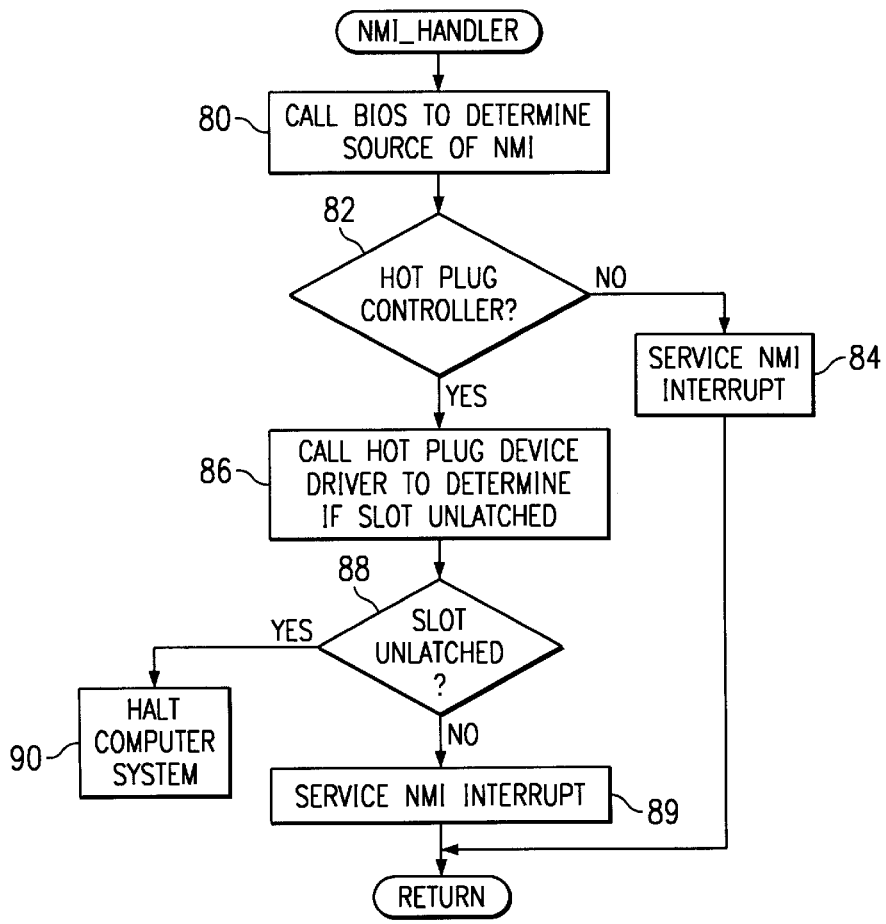
FIG. 4 is a flow diagram of an algorithm to handle nonmaskable interrupt requests.

Referring to FIG. 4, when a NMI request occurs, control is transferred to (i.e., the CPU 14 begins executing code from) the NMI handler 72. After being called, the NMI handler 72 configures the CPU 14 to call 80 the BIOS 25 (i.e., execute code from the BIOS 25) to determine 82 whether the hot plug controller 50 generated the NMI request. If not, the CPU 14 otherwise services 84 the NMI request and control transfers back to the operating system 60. Otherwise, the CPU 14 calls 86 a routine of the hot plug driver 70 to determine 88 if a lever 56 of an associated slot 36 "in use" (by one of the drivers 64) has become unlatched. If so, the CPU 14 halts the computer system 10. If not, the CPU 14 otherwise services 89 the NMI request and control transfers back to the operating system 60.

Figure 5:
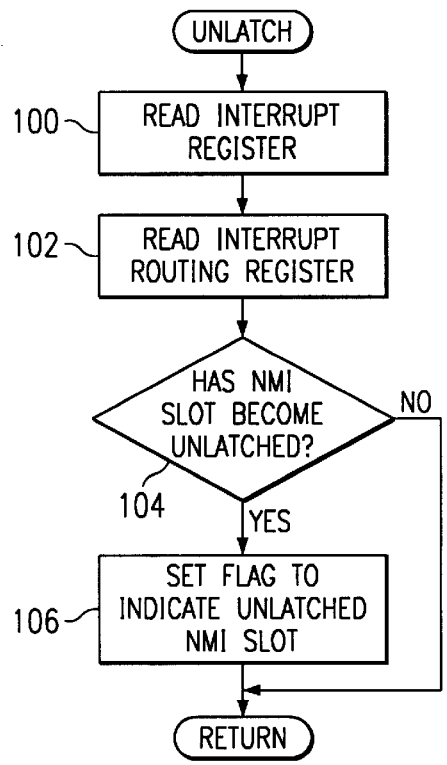
FIG. 5 is a flow diagram of an algorithm to determine the source of an interrupt request.

Referring to FIG. 5, the hot plug device driver 70 has a routine (called by the NMI handler 72) to determine if the most recent NMI request is due to a lever 56 associated with a slot 36 "in use" becoming unlatched. In this routine, the CPU 14 reads 100 the status register 55 and reads 102 the type register 51. Based on both this information and the stored status from the last time the CPU 14 read the status register 55, the CPU 14 determines 104 whether one of the levers 56 associated with a slot 36 "in use" has become unlatched. If not, control transfers back to the NMI handler 72. If so, the CPU 14 sets 106 a flag to indicate this event before control transfers back to the NMI handler 72.

Figure 6:
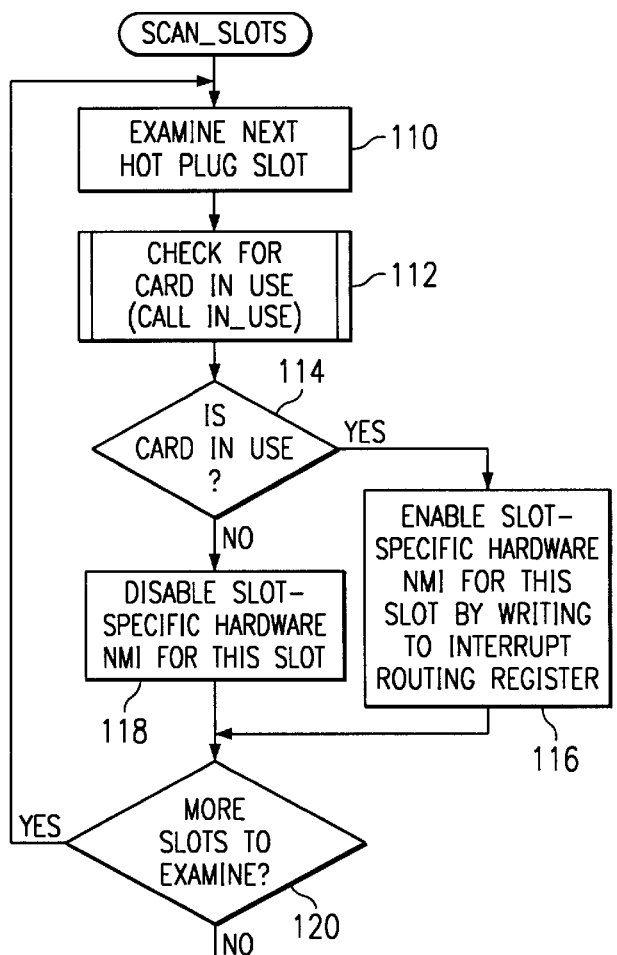
FIGS. 6 and 7 are flow diagrams of algorithms to determine which slots are being used by software.

Referring to FIG. 6, the hot plug device driver 70 has a routine that is called to program the type register 51 and thus, set which levers 56 are capable of generating NMI requests. In this routine, for each slot 36, the device driver 70 calls 112 a routine (FIG. 6) to determine 114 whether the particular slot 36 is in use. If the slot 36 is in use, the CPU 14 sets the bit in the type register 51 that corresponds to that slot 36. If the slot 36 is not in use, then the CPU 14 clears the bit in the type register 51 that corresponds to that slot 36. The CPU 14 then determines 120 whether there are more slots 36 to examine, and if so, the CPU 14 examines 110 the next slot 36 and repeats the above-described process. Once the CPU 14 determines the bit configuration for the type register 51, the CPU 14 writes the appropriate byte to the register 51.

Figure 7:
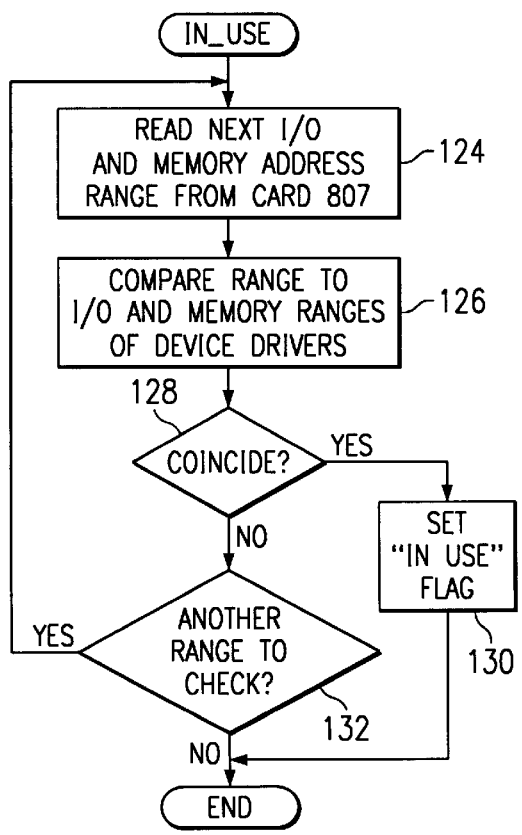

Referring to FIG. 7, to determine whether one of the slots 36 is in use, the CPU 14 reads 124 the I/O and memory space ranges from the configuration header space (i.e., the configuration space base registers) of the card 52 inserted in the slot 36. The CPU 14 then compares 126 the ranges from the card 52 with the I/O and memory space ranges stored in the device driver registry 62. If the CPU 14 determines 128 the ranges coincide (i.e., at least one device driver is registered to use the card 52), then the CPU 14 sets 130 an "in use" flag to label the slot 36 as being in use, and the routine is terminated. If the ranges do not coincide, the CPU 14 reads 124 the next I/O or memory address range from the card 52 and repeats the above-described process.

Figure 8:
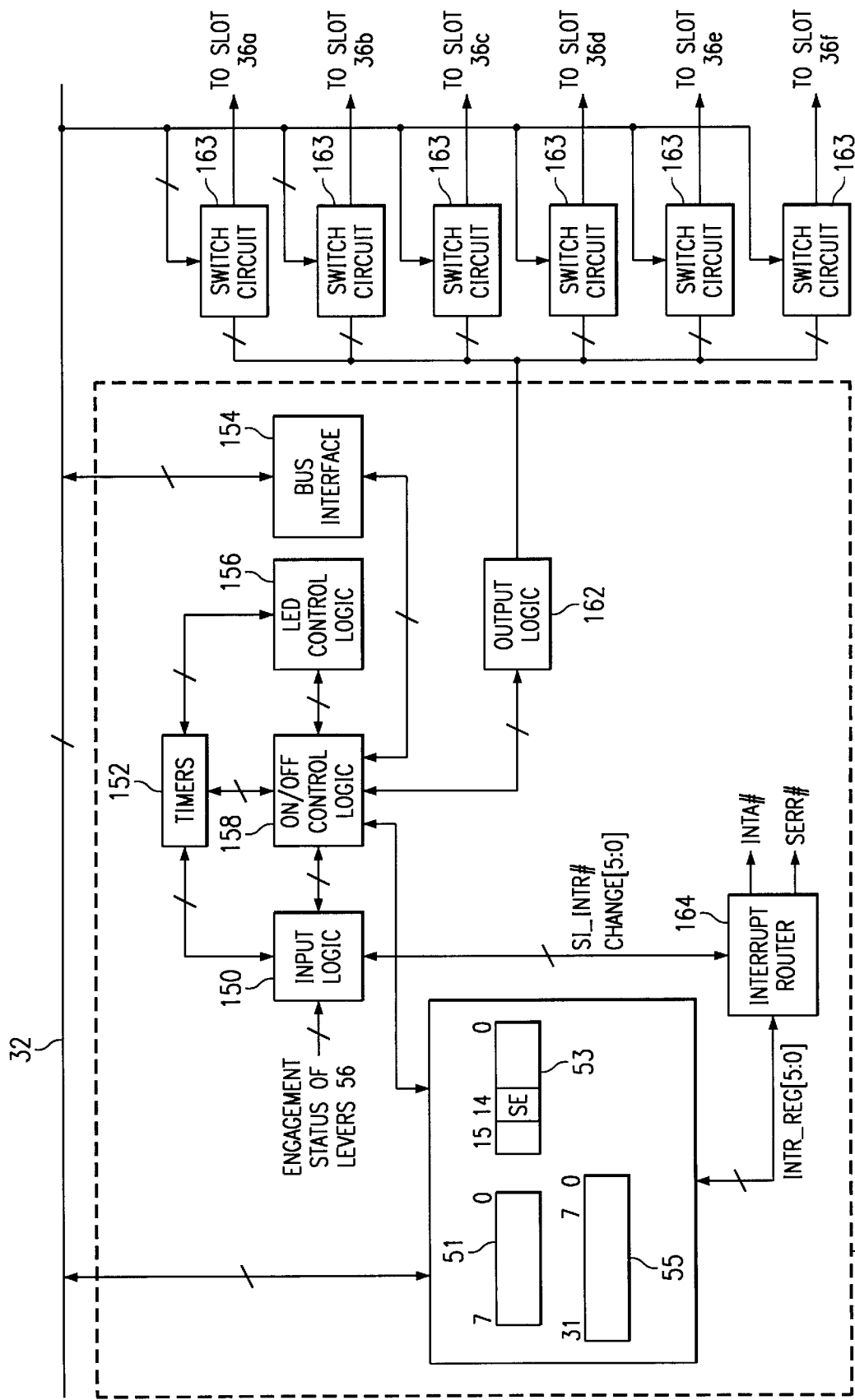
FIG. 8 is a block diagram of the hot-plug controller.

As shown in FIG. 8, the hot plug controller 50 has input logic 150 which scans the engagement status of the levers 56 and informs on/off control logic 158 when one of the levers 56 of a slot 36 that is powered up has become unlatched. The input logic 150 also generates an interrupt signal called SI_INTR# that is asserted, or driven low, when the engagement status (i.e., latched or unlatched) of one of the levers 56 changes. The input logic 150 also generates a multi-bit signal called CHANGE[5:0] whose bits indicate (by their assertion) which levers 56 have changed engagement states. The on/off control logic 158 interacts with output logic 162 and switch circuits 163 to selectively connect/disconnect the slots 36 to/from the bus 32 via power up and power down sequences, respectively. Timers 152 (coupled to the input logic 150 and the on/off control logic 158) are used to control how fast the levers 56 are scanned and the power up and down sequences. The on/off control logic 158 interacts with a bus interface 154 to execute dummy cycles to hold the bus 32 during the power up and down sequences. A more detailed description of the powering up and down of the slots 36 and the hot plug controller 50 is found in U.S. patent application Ser. Nos. 08/658,602 and 08/658,538, filed Jun. 5, 1996, which are incorporated by reference.

The hot plug controller 50 also has an interrupt router 164 which, in response to the assertion of the SI_INTR# signal, asserts either the nonmaskable interrupt signal INTA# or the maskable interrupt signal SERR#, based on the contents of the type register 51 and the engagement status of the latches 56. The router 164 uses the signal CHANGE[5:0] and the bits of the status register 55 to determine if a latch 56 that was previously engaged has become disengaged. If so, the router 164 asserts either the SERR# signal or the INTA# signal, depending on the appropriate bit of the type register 51.

Other embodiments are within the scope of the following claims.

What is claimed is:

1. A method for use in a computer system having a connector capable of receiving a removable circuit card and a mechanism associated with the card and connector, the mechanism having a state indicating when the card is secured to the connector, the method comprising:

determining when software of the computer system is interacting with the connector; and based on the determining, taking corrective action to prevent the software from interacting with the connector when the state of the mechanism indicates the card is not secured to the connector.

2. The method of claim 1, wherein the taking corrective action includes halting the computer system.

3. The method of claim 1, wherein the taking corrective action includes halting the computer system only when the software is interacting with the circuit card.

4. The method of claim 1, wherein
the computer system includes a central processing unit having an interrupt pin, and
the taking corrective action includes providing an interrupt signal to the pin.

5. The method of claim 4, wherein the interrupt signal comprises a nonmaskable interrupt signal.

6. The method of claim 1, further comprising
storing a first address range used by the software in a registry of the computer system,
storing a second address range that is accessible via the connector, and wherein
the determining includes comparing the first and second address ranges.

7. The method of claim 1, wherein
the computer system includes a central processing unit having a first interrupt pin for receiving a first type of interrupt signal and a second interrupt pin for receiving a second type of interrupt signal, the first type of interrupt signal always having a higher priority than the second type of interrupt signal, and
the taking corrective action includes providing the first type of interrupt signal to the first interrupt pin.

8. The method of claim 7 wherein the first type of interrupt signal comprises a nonmaskable interrupt signal.

9. The method of claim 7, wherein the interrupt signal of the second type is sent to the second interrupt pin when the software is not interacting with the connector.

10. The method of claim 7, wherein the second interrupt signal comprises a maskable interrupt signal.

11. A method for use in a computer system having a central processing unit and connectors, the central processing unit having a nonmaskable interrupt pin for receiving a nonmaskable interrupt signal and a maskable interrupt pin for receiving a maskable interrupt signal, each connector capable of receiving a removable circuit card and connected to a clamp for securing the card to the connector when the clamp is engaged, the method comprising:

determining which of the connectors are being used by software of the computer system;

monitoring the engagement state of the clamps;

providing the maskable interrupt signal to the maskable interrupt pin when the clamp becomes disengaged and the associated connector is not being used by the software of the computer system; and taking corrective action to prevent the software from using the card when the clamp becomes disengaged and the associated connector is being used by software of the computer system, the corrective action including:

providing the nonmaskable interrupt signal to the nonmaskable interrupt pin, and halting the computer system in response to the providing the nonmaskable interrupt signal.

12. A method for use in a computer system having a connector for receiving a circuit card, the computer system having a registry for storing a first address range used by software, the circuit card storing a second address range used by the card, the method comprising:

reading the first address range from the registry;

reading the second address range from the circuit card; and comparing the first and second address ranges to determine if the software is interacting with the connector.

13. A computer system comprising:

a connector;

a circuit card inserted in the connector;

a mechanism associated with the connector and the card, the mechanism having a state for indicating when the card is secured to the connector;

a controller configured to monitor the state and provide an indication when the state changes;

a processor configured to:
 determine when software of the computer system is interacting with the connector, and
 based on the determining and the indication, regulating interaction of the computer system with the card.

14. The computer system of claim 13 wherein the processor is configured to regulate the interaction by halting the computer system.

15. The computer system of claim 13 wherein the processor is configured to regulate the interaction only when the software is using the connector.

16. The computer system of claim 13, wherein the processor has an interrupt pin and the processor is configured to regulate the interaction when an interrupt signal is received at the pin.

17. The computer system of claim 16, wherein the interrupt pin comprises a nonmaskable interrupt pin, and the interrupt signal comprises a nonmaskable interrupt signal.

18. The computer system of claim 13, further comprising a memory storing a first address range used by the software, wherein:

the circuit card has a memory storing a second address range used by the card, and the processor is configured to determine by comparing the first and second address ranges.

19. The computer system of claim 13, wherein the processor has a first interrupt pin for receiving a first type of interrupt signal and a second interrupt pin for receiving a second type of interrupt signal, the first type of interrupt signal always having a higher priority than the second type of interrupt signal, and the processor is configured to regulate the interaction when the first type of interrupt signal is received at the first interrupt pin.

20. The computer system of claim 19 wherein the first type of interrupt comprises a nonmaskable interrupt signal.

21. The computer system of claim 19, wherein the controller is configured to provide the second type of interrupt signal when the software is not interacting with the circuit card.

22. The computer system of claim 21 wherein the second interrupt signal comprises a maskable interrupt signal.

23. A computer system comprising:

connectors, each connector configured to receive a removable circuit card;

clamps, each clamp being associated with one of the connectors and being configured to secure the card to the associated connector when the clamp is engaged;

a processor configured to:
 determine which connectors are being used by software algorithms of the computer system,
 provide an indication of the connectors being used,
 inform one or more of the software algorithms that one of the clamps has become disengaged in response to a maskable interrupt signal, and
 halt the computer system in response to a nonmaskable interrupt signal; and a controller configured to:
 monitor the engagement status of the clamps,
 provide the maskable interrupt signal when one of the clamps becomes disengaged and the associated connector is not being used by any of the software algorithms of the computer system, and
 provide the nonmaskable interrupt signal when one of the clamps becomes disengaged and the associated connector is being used by one or more software algorithms of the computer system.

24. A computer system comprising:

a connector;

a memory storing a first address range used by a software algorithm;

a removable circuit card inserted into the connector, the circuit card storing a second address range accessible through the connector; and a processor configured to:
 read the first address range from the memory,
 read the second address range from the circuit card, and
 compare the first and second address ranges to determine if the software algorithm is interacting with the connector.

* * * * *